INVENTOR
BRITTON CHANCE

BY Herman L. Gordon
ATTORNEY

United States Patent Office 3,666,362
Patented May 30, 1972

3,666,362
DUAL WAVELENGTH SPECTROPHOTOMETRY
Britton Chance, c/o Johnson Research Foundation Medical School, University of Pennsylvania, Philadelphia, Pa. 19104
Filed Dec. 22, 1970, Ser. No. 100,697
Int. Cl. G01j *3/42;* G01n *21/22*
U.S. Cl. 356—88                              19 Claims

ABSTRACT OF THE DISCLOSURE

A dual wavelength spectrophotometer in which compensation is made for lamp noise by extracting a portion of the time-shared dual wavelength light beam before it enters the sample and generating a compensation signal therewith in an auxiliary photomultiplier. The compensation signal is normalized and subtracted from the measure signal in a differential amplifier over a band width including frequencies considerably above the light switch frequency.

---

This invention relates to dual wavelength spectrophotometers, and more particularly to a spectrophotometer having means to compensate for light source noise.

A main object of the invention is to provide a novel and improved dual wavelength spectrophotometer which has highly effective light source noise rejection characteristics and which employs relatively simple and inexpesinve components to obtain said improved noise rejection characteristics.

A further object of the invention is to provide an improved lamp noise-compensated dual wavelength spectrophotometer which has a high degree of sensitivity, which has high optical resolution, which permits continuous monitoring of the transmission of a sample at any given wavelength while providing comparison with transmission at another wavelength, and which has a wide range of applications, such as quantitative spectrophotometric assay and dynamic recording of absorbancy changes occurring with time, particularly in the monitoring of very small absorbance changes or very small changes in turbidity or optical density of a sample.

A still further object of the invention is to provide an improved light source noise-compensated dual wavelength spectrophotometer which employs an auxiliary photomultiplier for noise compensation and which contains improved means for providing a properly balanced electrical output from the compensating photomultiplier.

A still further object of the invention is to provide an improved light source noise-compensated dual wavelength spectrophotometer which accurately compensates for light intensity fluctuations inherent in its light source, which is adapted for scanning operation so that it is possible to correct for the wavelength-dependent properties of the light source, the monochromators, the photomultipliers, and the like, which provides simplified observation of electronic output, and which can be readily adapted for simultaneous non-interfering fluorescence and absorbance measurements.

Further objects and advantages of the invention will become apparent from the following description and claims, and from the accompanying drawings, wherein:

Figure 1:
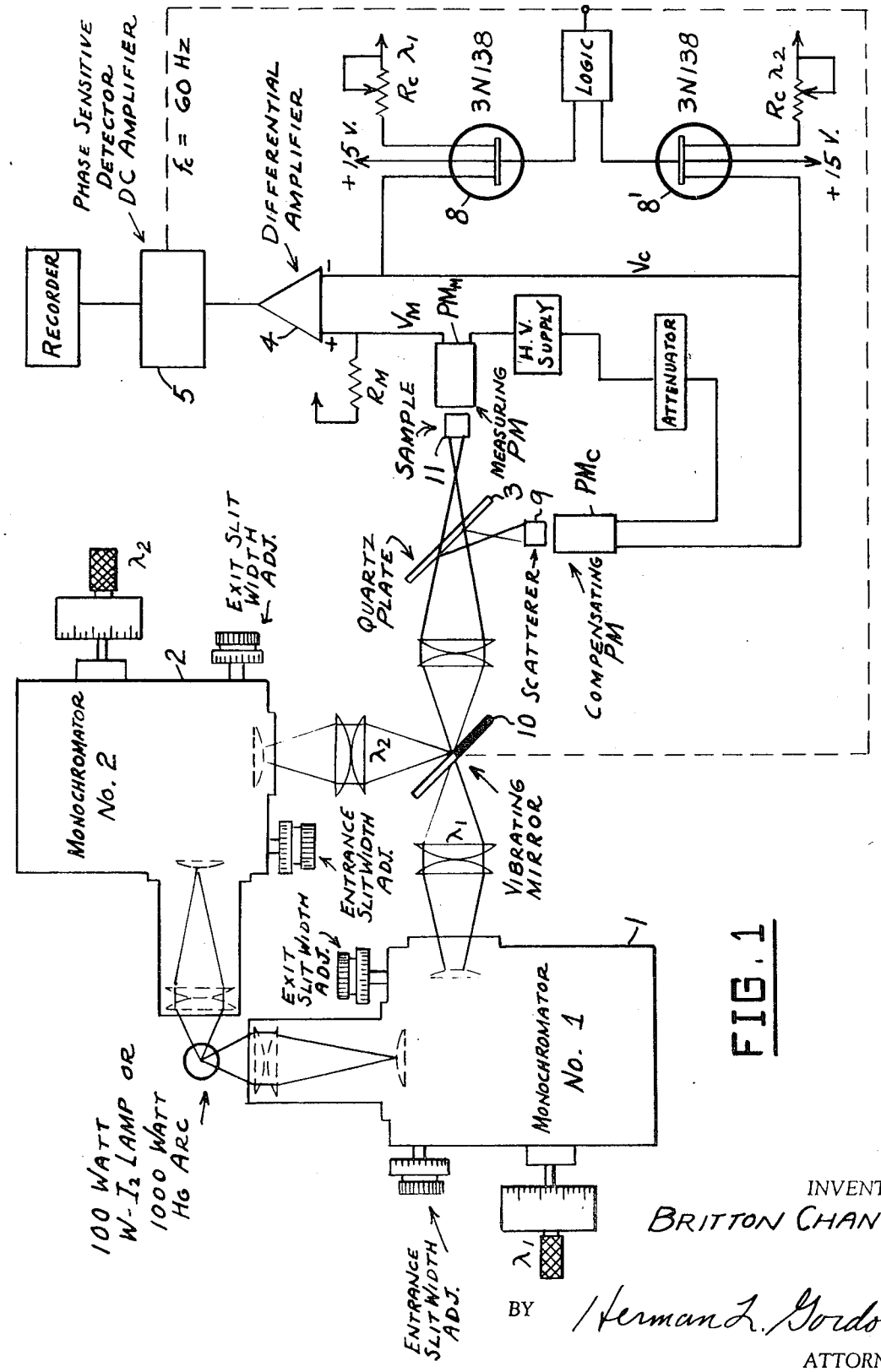
FIG. 1 is a schematic block diagram of a typical compensated dual wavelength spectrophotometer constructed in accordance with the present invention, showing the use of a switched load resistor circuit for the compensating photomultiplier.

The development of double beam spectrophotometry is largely a consequence of the inability of single beam techniques to cope with the measurement of small absorption changes, superimposed on a large and variable background signal. Since such signals are the rule, rather than the exception, in studies of living matter and related chemical systems, the double beam technique has been increasingly applied to such problems. (See, for example, B. Chance, Review of Scientific Instruments, 22, 619 (1951).)

Basically, the double beam technique constitutes a differential method of measurement. It attempts to eliminate the large background signal due to nonspecific absorption in the sample by simultaneous measurements at two separate, suitably chosen wavelengths $\lambda_1$ and $\lambda_2$. (See R. Rikmenspoel, Appl. Opt. 3, 351 (1964) or J. Cowles, J. Opt. Soc. Amer. 55, 960 (1965).) A further benefit of this technique consists of a reduction of instrumental artifacts, such as fluctuation in the light intensity and drift in the detector system, by the common mode rejection inherent in a differential system. Instruments capable of such simultaneous measurements were described by Millikan (G. A. Millikan, J. Physiol. 79, 152 (1933) and Chance (B. Chance, Review of Scientific Instruments, 13, 158 (1942).) In these, a sample exposed to white light from a tungsten filament lamp was viewed by two photocells through optical bandpass filters transmitting at $\lambda_1$ and $\lambda_2$, respectively. This arrangement requires a substantial pathlength between sample and photodetector, particularly when the need for high optical resolution necessitates the use of monochromators in place of the filters. The resulting poor light-gathering ability of the measuring system makes it difficult to measure rapid but small changes of absorption on turbid materials. (See B. Chance, Review of Scientific Instruments, 18, 601 (1947) and F. A. Holton et al., Biochem. J. 67, 579 (1957).)

In systems where the sample is illuminated by monochromatic beams I of wavelengths $\lambda_1$ and $\lambda_2$, a single photodetector may be placed directly behind the sample, thus eliminating this problem. However, simultaneous illumination cannot be employed, since the occurrence of even small amounts of scattering in the sample would cause light from one channel to affect the other. This led to the adoption of alternate illumination of the sample with beams $I_{\lambda_1}$ and $I_{\lambda_2}$, implemented by a light switch in the form of a small front surface mirror mounted on the vibrating part of a Minneapolis Honeywell Brown converter which operates at 60 Hz. In this arrangement, the two light beams $I_{\lambda_1}$ and $I_{\lambda_2}$ reach the mirror at right angles to each other. The mirror itself vibrates in a vertical plane which is at 45° to each beam. In this way, one of the beams is alternately reflected onto, and the other alternately passed through to, the sample. When properly aligned, the two resulting pulse trains of light $I_{\lambda_1}$ and $I_{\lambda_2}$ take exactly the same path to the sample, giving rise to a composite beam which is time shared by $I_{\lambda_1}$ and $I_{\lambda_2}$. This beam is operated upon by the absorbancy transfer function of the sample, which is both time dependent and wavelength selective. Following an experimental perturbation of the sample, each half-cycle of the composite beam is, in general, affected differently. Since the desired information is contained in this difference, it can be retrieved by a simple fullwave sensitive detector (see A. Van der Ziel, "Noise" (Prentice-Hall, Inc., Englewood Cliffs, N.Y., 1956), p. 343). The output produced by this detector is smoothed by a boxcar type holding circuit (see J. L. Lawson and G. E. Uhlenbeck, "Threshold Signals" (Boton Technical Publishers, Boston, 1964), p. 258) which is followed by a multisection low lass RC circuit for further integration and a variable gain DC amplifier.

A number of modified versions of the instrument have been constructed since 1951. All retain the basic principal of alternate illumination and phase sensitive detection, but some of them use different types of light switches. The switching frequency is, in most cases, that of the local power line, i.e., 50 or 60 Hz., although higher frequencies, such as 400 and 1000 Hz., have been used occasionally.

The fact that light is of a statistical nature imposes an ultimate limit upon the sensitivity of double beam measurements. Before this theoretical noise limit can be approached, all noise generated within the instrument, as well as outside interference, must be reduced to a minimum. This is greatly facilitated by the presence of a time shared carrier system which affords the use of a full-wave phase sensitive detector. Phase sensitive (sometimes called lock-in) measuring systems constitute a powerful method for the recovery of weak signals from large amounts of stochastic noise. (See R. H. Dicke, Review of Scientific Instruments, 17, 268 (1946).) Full-wave phase sensitive detectors offer additional advantages in the rejection of periodic interference. (See M. J. Wright, Electron, Eng. 34, 698 (1962).) They are completely insensitive to frequencies unrelated to the carrier and to the even harmonics of the carrier. Odd harmonics which are in quadrature with the carier are rejected completely, while those which are in phase are attenuated in proportion to their order.

A large amount of the noise encountered in instruments currently in use is generated by the light source. This includes intensity fluctuations which are caused by variations in the supply voltage, as well as noise arising within the lamp itself.

Noise in tungsten incandescent lamps seems to be largely due to turbulence caused by non-uniform heat convection within the glass envelope. (See B. Chance, Review of Scientific Instruments, 22, 619 (1951).) This noise is limited to relatively low frequencies and shows l.f. behavior. Hydrogen and deuterium lamps are similarly "quiet" (see B. Chance, "Biochemistry of Quinones," R. A. Morton, ed. (Academic Press Inc., London, 1965), p. 460 and B. Chance, Biophys, Soc. Mfg., Abstr. P–6, 43 (1960)), particularly if ozone accumulation is avoided.

A completely different type of noise is produced by the commonly used xenon and mercury arc lamps. Both the plasma in the high pressure capillary mercury lamps, and the short arcs developed between metal electrodes in the xenon lamps, have much less inertia as compared to the glowing filament of the tungsten lamps. Consequently the noise resulting from plasma instabilities and positional changes of the xenon arc is not limited to low frequencies, but may include spectral components up to several thousand hertz.

The lock-in technique is most powerful in the elimination of noise which is generated, or which enters the system from the outside, between the light switch and the phase sensistive demodulator. It is considerably less effective in dealing with noise originating before the light switch, i.e., lamp noise, unless this noise is limited to frequencies which are sufficiently below the carrier frequency ($f_c$) to exclude a contribution at $f_c$. The attenuation which the detector action provides for higher frequency noise may be considered as follows:

Under normal operating conditions, the time constant $\tau$ of the filter is much greater than the sampling time $\Delta\tau$ of the detector. Thus, the detector action can be viewed as performing a total $n$ of approximately $n=\tau/\Delta\tau$ sequential subtractions for each datum point. Since the input signal remains essentially constant during this operation, after $n$ substractions the output signal will be increased by a factor $n$. The noise content of the signal, however, adds randomly, giving a final amount of $n^\gamma$, where $\gamma \leq 1$. In the case of white noise, $\gamma=\frac{1}{2}$, and the improvement in signal-to-noise ($S/N$) ratio amounts to $(\tau/\Delta\tau)^{\frac{1}{2}}$. Although this relation is generally not satisfied if the noise is nonwhite, it nevertheless represents a fairly good approximation for most practically occurring noise power spectra, provided they are continuous. For measurements outside the range where $\tau/\Delta\tau$ is sufficiently large to produce noise rejection by this mechanism, or in cases where the noise is non-stochastic and not amenable to this type of operation, the usable sensitivity of the instrument is severely limited.

Difficulties of this type arose recently in attempts to measure small absorbancy changes in turbid suspensions of subcellular particles at wavelengths between 200–300 nm. The absorption of biological materials generally increases rapidly as the wavelength is decreased below 300 nm. However, a number of metabolically interesting compounds, such as the quinones (ubiquinone, vitamin K, etc.), adenine nucleotides, and thiol esters, show characteristic absorption peaks in this region, making it highly desirable to acquire the technical ability for their measurement. (See B. Chance, "Biochemistry of Quinones," R. A. Morton, ed. (Academic Press Inc., London, 1965), p. 460, and J. Harting and B. Chance, Fed. Proc. 12, 714 (1953).) Satisfactory performance for relatively slow changes was obtained with hydrogen (see B. Chance, Biophys. Soc. Mfg., Abstr. P–6, 43 (1960) and B. Chance and E. R. Redfearn, Biochem. J. 80, 632 (1961)) and deuterium (see B. Chance, "Biochemistry of Quinones," p. 460 above cited) arcs and with the medium pressure mercury arcs (see L. Szarkowsk and M. Klingenberg, Biochem. Z. 338, 647 (1963)) but faster measurements in highly turbid suspensions require the use of the more intense, less stable xenon and mercury arcs.

A number of possible ways to improve the sensitivity of double beam systems in which lamp fluctuations are the limiting factor have been explored in detail. Some improvement resulted from increasing the line regulation in the lamp power supply. Much better results were obtained, particularly with arc lamps, through stabilization involving an optical feedback loop to the power supply. (See B. Chance, Electronics 13, 2 (1940).) However, besides being rather costly, it was difficult to obtain adequate bandwidth in the servoloops at the high loop gains necessary to stabilize some of the lamps. With incandescent lamps, very good results could be obtained by measuring the ratio of the components $I_{M\,1}$ and $I_{M\,2}$ $$I_{M\lambda_1} \text{ and } I_{M\lambda_2}$$

of the measure beam, rather than their difference, since their noise is limited to frequencies below the switching frequency ($f_N < f_c$). This was accomplished either through dynode feedback (see M. H. Sweet, Electronics 19, 105 (1946) or C. C. Yang, Review of Scientific Instruments, 25, 807 (1954)) or by placing a logarithmic amplifier between the photomultiplier and the phase sensitive detector. In addition to improving the $S/N$ ratio, this method also provides for a partial reduction of errors caused by wavelength dependent scattering in the sample. (See G. A. Millikan, J. Physiol 79, 152 (1933).)

Noise compensation for light source fluctuations with a separate detector viewing a portion of the light input or light output from the monochromator is a simple and relatively inexpensive system. However, its application to dual wavelength technique is extremely difficult because of the fact that the mechanical balancing of the light output of monochromators 1 and 2 (FIG. 1), which gives a balanced electrical output of the measuring photomultiplier, does not give a balanced electrical output from the compensating photomultiplier. Demodulation of the signals from the measure and compensating photomultipliers with the insertion of suitable offset and gain corrections at best provides compensation only for low frequency components of the noise spectrum of the lamp.

Methods for correcting the unbalance of the output of the compensating photomultiplier have been considered for some time and various schemes including a small AC light input to the compensating photomultiplier have been tested. The present disclosure describes three simple methods (Polaroid compensation, gain control compensation, and dynode voltage compensation) which allow matching of both the DC and the AC amplitudes of the output of the measure and compensating photomultipliers to an extremely high accuracy and thereby permit their subtraction in a wide band amplifier, resulting in rather dramatic improvements in $S/N$ ratio when using high intensity gas discharge lamps as light sources. The principle of this method is shown in FIG. 1.

The term "Polaroid" is a trademark designating a material for producing polarized light from unpolarized light by dichroism consisting typically of a stretched sheet of colorless plastic treated with an iodine solution so as to have long thin parallel chains of polymeric molecules containing conductive iodine atoms. (See Random House Dictionary of the English Language, 1967, Random House Inc., New York, N.Y., page 1112.) This material is manufactured by Polaroid Corporation, Cambridge, Mass.

In the embodiment of the invention shown in FIG. 1, a partially reflecting mirror 3 is arranged at 45° between light switch 10 and sample 11. It permits approximately 90% of the light to pass through to the sample, and on to the measure photomultiplier $PM_M$. The remaining 10% is reflected onto a scattering plate 9 which is viewed by a compensation photomultiplier $PM_C$. The anodes of $PM_M$ and $PM_C$ are connected to the inputs of a differential amplifier 4, whose output in turn, feeds a regular double beam detector circuit 5. (See L. Salganicoff, M. Kraybill, D. Mayer, and V. Legallais, Journal of Chromatography, 26, 434 (1967).) With this arrangement, the output signals from the two channels are subtracted over a bandwidth which extends considerably above the switching frequency, $f_c=60$ Hz. Consequently, noise which is common to both channels is largely eliminated, since under the proper gain conditions, all its spectral components contained in this frequency range are cancelled out.

Figure 3:
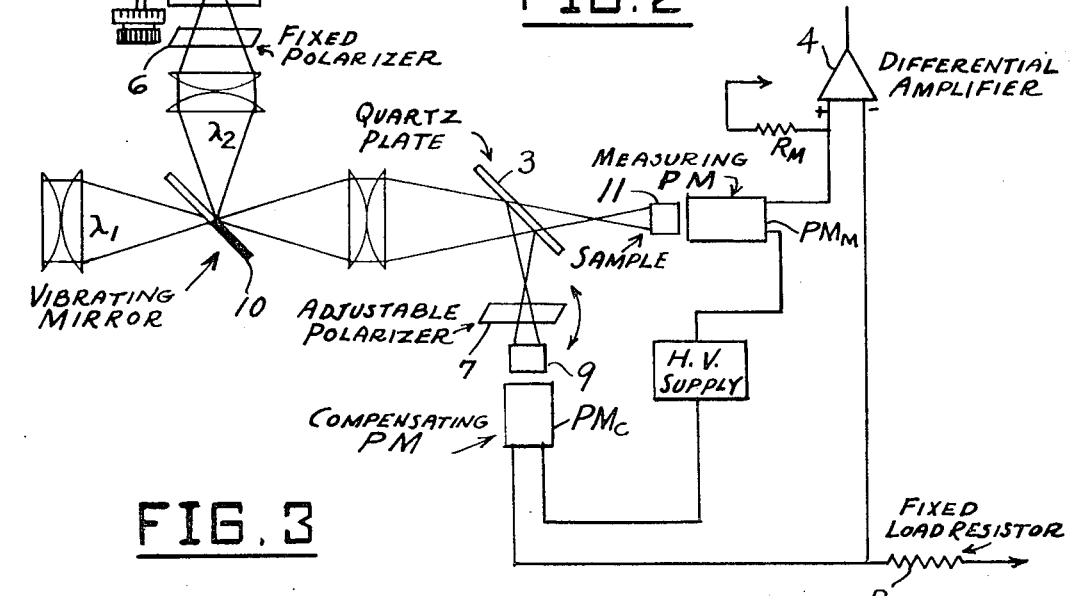
FIG. 3 is a partial schematic block diagram of another modification of the dual wavelength spectrophotometer of the present invention, showing the use of partially crossed polarizers in the optical system arranged for variable attenuation of the compensating beam, with a fixed load resistor for the compensating photomultiplier.

Both optical and electrical means of balancing have been developed. The optical method is based on the attenuation obtainable with filters, wedges, or, more conveniently, with two partially crossed polarizers. In the latter case, illustrated in FIG. 3, one polarizer 6 is stationary and is mounted at the exit slit of the monochromator producing the beam which is least absorbed by the sample 11, for example, monochromator 2. The second polarizer 7, which can be rotated, is placed between the sample and the compensating photodetector $PM_C$. It provides for a range of continuously variable attenuation of the polarized component of the compensating beam and fixed attenuation for the nonpolarized component. This method is attractive mainly because of its simplicity. Polarizers are limited to application at wavelengths above 230 nm., while wedges made from UV transparent materials can, of course, be used at lower wavelengths.

The wavelength dependency is eliminated if balancing is accomplished electrically. For this, two slightly different techniques have been developed. In both, the gain of the compensation photomultiplier $PM_C$ is alternated between one value for $V_{C_{\lambda_1}}$, and another for $V_{C_{\lambda_2}}$. This operation requires both a sufficiently large dynamic range to allow balance for a variety of different samples, and response rapid enough to reach the desired gain within a fraction of each half-cycle of the switching frequency. In the first of these methods, gain alternation is accomplished through use of two adjustable load resistors $R_{c\lambda_1}$ and $R_{c\lambda_2}$ (FIG. 1). Synchronously and in the proper phase with the composite signal, one or the other is activated through appropriate gating pulses to the MOSFET transistors 8 and 8' serving as switches. Since the on-resistance and the off-resistance of these transistors are, respectively, very much below and above the value of the load resistor, the effective resistance is at all times substantially given by either $R_{c\lambda_1}$ or $R_{c\lambda_2}$.

Figure 2:
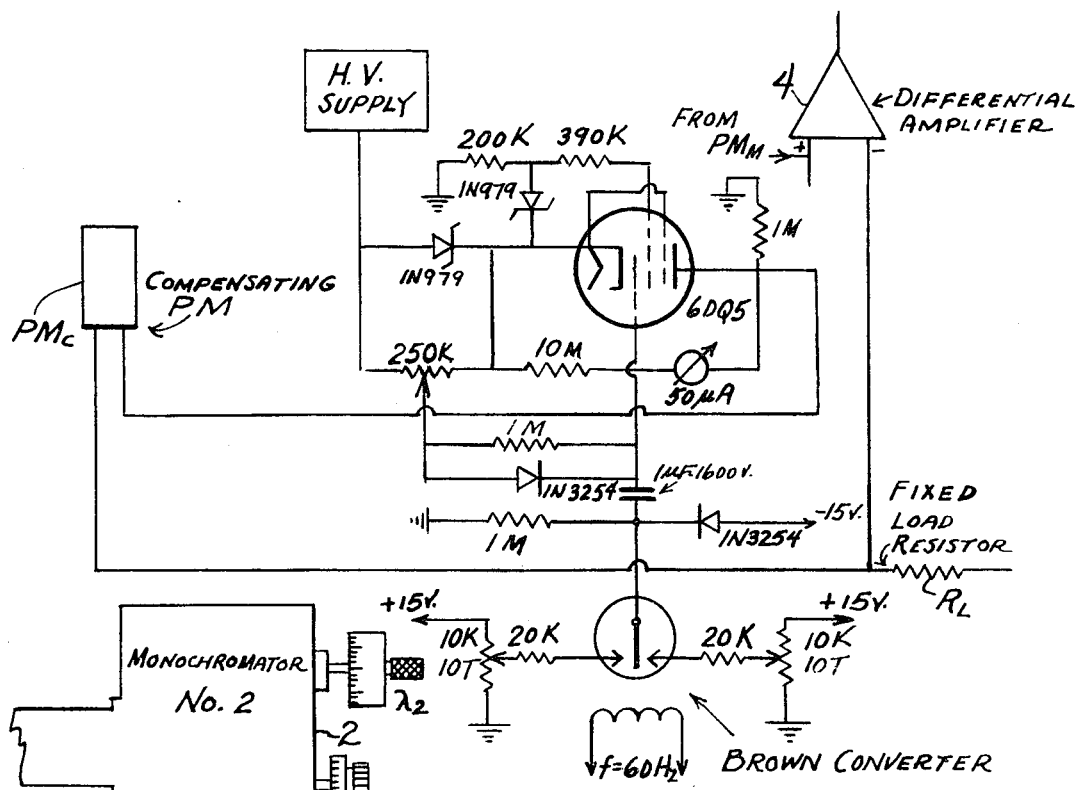
FIG. 2 is a partial schematic block diagram of a modification of the dual wavelength spectrophotometer of the present invention, showing the use of a switched dynode voltage control circuit and a fixed load resistor for the compensating photomultiplier.

Alternating gain settings in the compensating channel can also be produced by gating the over-all dynode voltage of $PM_C$. In this case the load resistor $R_L$ remains constant. A diagram of the electronics used for this purpose is shown in FIG. 2. Basically this second technique is capable of a larger dynamic range, since the photomultiplier gain is exponentially dependent upon the dynode voltage. However, some difficulties arise because of capacitive coupling between the dynodes and the anode, leading to objectionable switching transients at large gain differences. An advantage of this method is that since the load resistor $R_L$ remains fixed, larger values may be used.

The effectiveness of the compensation techniques has been tested with several types of light sources under different experimental conditions. The AH–6 type water cooled mercury arc lamp has long been in use as a light source for fluorescence and absorption measurements. (See B. Chance and E. R. Redfearn, Biochem. J. 80, 632 (1961).) These lamps provide maximum surface brightness in cases where the wavelength requirement of the experiment is compatible with the line structure of the mercury emission spectrum or the background continuum. The arcs are pretested for noise and the approximately 10% which have noise contributions of less than 2% are reserved for applications requiring maximum sensitivity. By detailed tests it has been found possible to use water cooled lamp housings which have two ports on adjacent sides, so that each monochromator is illuminated with the full intensity (as in FIG. 1). The capillary arc of the AH–6 is not subject to the mechanical instability of the lower pressure mercury or xenon arcs. Such arcs require beam splitting prior to the monochromators. This is also required for lamps with a preferred direction of emission, such as deuterium lamps. The AH–6 is operated from an unstabilized DC supply. Attempts to stabilze by means of an optical feedback loop were not successful. The arc exhibits low and high frequency fluctuation noise from less than 1 Hz. up to several thousand Hz.

Details of the results of tests confirming the advantages of the noise compensating means of the present invention will be found in B. Chance et al., Review of Scientific Instruments, 41, 111 (January 1970).

In the case above described, the noise compensating means employed two partially crossed Polaroid polarizers for optical balancing and provided a noise reduction of more than tenfold.

Balance of the system was achieved in the following order: first the smaller component of the measure beam was set equal to a fixed reference voltage to effect full scale calibration. Then the larger component was adjusted to the same value by mechanically altering either height or width of the exit slit on the appropriate monochromator. Then the nonpolarized component (which is also the smaller) of the compensating beam was balanced with the reference voltage by adjusting the dynode voltage on the compensating photomultiplier. Finally, the second (polarized) component was balanced by rotating the Polaroid 7 in front of the compensating photomultiplier.

In another test (see the above-mentioned article) the electrical balancing arrangement was tested using a 450 w. xenon arc lamp connected to an unstabilized DC supply for illumination. The results indicated that at wavelengths near 290 nm. the xenon arc is somewhat inferior to the AH–6 in terms of low frequency noise, but that either arc is readily usable at high performance. Both arcs deliver approximately equal performance in the visible region.

With electrical compensation, balance is achieved in the same sequence as with the polarizers. Only now the larger component of the compensating beam is brought to the correct level by alteration of either the appropriate switched load resistor of $PM_C$ or the switched dynode voltage, depending on what circuit is employed at the time.

The tests also showed the effectiveness of the compensating circuit for taking out long term fluctuations (see the above-mentioned article). In a typical test, peak noise equivalent to 0.006 optical density in the measure beam was reduced to 0.0003 optical density by compensation, resulting in a noise reduction factor of 20.

Dual wavelength spectrophotometry is frequently used to measure the small absorbance changes superimposed on a large variable background absorbance typical for intact organs and isolated cell organels (mitochondria, microsomes, etc.). As above mentioned, a number of dual wavelength spectrophotometers incorporating time-shared illumination have become commercially available in recent years. In some routine experiments the wavelength variation and spectral resolution offered by these instruments, all of which employ gratings or prisms as dispersing elements, is not essential. In particular, the study of the cytochromes, flavoproteins, and pyridine nucleotide components of mitochondria require only a few specific pairs of wavelengths. In these instances, it is possible to replace the monochromators 1 and 2 with less costly and more efficient optical arrangements using interference filters, which are readily available over the entire visible range of the spectrum at half band widths of less than 5 nm. and maximum transmission of 40% or more. Filters may also be used at wavelengths slightly below the one for which they are specified, by mounting them at a slight tilt, rather than that of their peak transmission.

In comparison with monochromator instruments, filter systems offer the advantage of higher luminous throughput. Equivalent aperture ratios of $f/2$ (versus $f/4-f/10$ for some monochromators) can be obtained without difficulty. The increased light intensity is of particular importance for shot-noise-limited measurements of turbid samples and may indeed be essential in providing an acceptable signal-to-noise ratio.

In a typical filter double-beam instrument such as above mentioned independent intensity adjustments for both beams may be provided by two screen type attenuators, consisting of metal discs covered with holes of varying diameters and density. The discs are located out of focus at the curvette and maintain a high ratio between the size of the beam at the disc and the diameter of the individual holes so that the resulting non-uniformity of the beam is negligible. An adjustable aperture stop is set for an equivalent aperture ratio of $f/2.1$. Electronic alternatives to mechanical balancing of the beam intensities are described above.

The electronic circuitry required for the operation of such a filter double-beam instrument consists of stabilized power supplies for the lamp and the photomultiplier, and a simple transistorized signal/demodulator/amplifier following the basic principles already described. The data are read out on either a strip chart recorder or a storage oscilloscope.

An instrument according to the present invention may be constructed in a rather compact modular design which permits easy incorporation into a larger system for multi-parameter readout from a single sample. Thus, an arrangement can be readily provided for simultaneous fluorescence and absorbance measurements. Fluorescence excitation may be provided by the use of an AC-operated 1000 w. AH–6 mercury arc lamp. Emission is monitored by a photomultiplier using reflectance geometry; excitation is applied to the same surface as that from which emission is measured. Part of the excitation beam is reflected onto a reference fluorochrome whose emission is view by $PM_C$. The signals produced by $PM_M$ and $PM_C$ are subtracted in a wide band amplifier. Thus, light source noise which affects both channels equally is largely cancelled out, resulting in a ten- to twenty-fold improved signal-to-noise ratio.

The fluorescence and absorption channels are rendered non-interfering through appropriately selected optical filters. Maximum isolation is obtained if there is no overlap of the fluorescence excitation and emission bands $F_x$ and $F_E$ with either the absorption measure band $\lambda_M$ or the reference band $\lambda_R$. With partially overlapping bands, satisfactory performance can be maintained by using filters with sufficiently high side-bands attenuation. Interference filters with side bands attenuation in excess of 5 O.D. are commercially available.

As will be readily apparent, the device of the present invention is of particular importance in the case where light sources are inherently noisy, and has been experimentally tested with mercury and xenon arcs as well as with deuterium arcs. There is no doubt that this kind of system renders the mercury arc feasible for routine quinone measurements in the high speed range.

In a number of cases it is desirable to avoid capacitance coupling in the monitoring of the time-shared waveform of the dual wavelength spectrophotometer. This is particularly true in the case where the actual carrier waveform is recorded on an oscilloscope. The compensation circuit does this since it subtracts both DC and AC components of the dual wavelength output.

The direct applications of this capability have been in the oscilloscope readout of expanded sweep waveforms so that kinetics occurring during the single light flash of the dual wavelength apparatus were clearly resolved. This expands the time range of the dual wavelength apparatus from that set by its demodulator (one period of the chopper) to that limited only by the band width of the amplifier, actually observed down to 29 msec. It is to be noted that there is a blind spot in such recording. The recording of the measuring interval lasts only for ½ the chopping interval. However, many chopper or time modulated systems have such blind spots and they are readily avoided by altering the modulation frequency or phasing the phenomenon appropriately with respect to the chopping frequency.

Since the compensating circuit converts the dual wavelength apparatus essentially into a split beam apparatus, it is possible to correct for the wavelength dependent properties of the light source, the monochromators, photomultipliers, etc. by the compensating circuit, essentially making the device a two-photomultiplier type of wave length scanning spectrophotometer. Such a system usually employs two samples which are identical in all respects except for the chromophore to be studied; one in the reference, or, in this case the compensating, optical path, the other in the measure optical path. Such circuits have been devised and, in addition, a potentiometer circuit for correcting the baseline as a function of wavelength has been employed. Examples of its performance are available. Such systems usually regulate the dynode voltage of the reference photomultiplier in order to maintain constant system sensitivity. In this case the photomultiplier output corresponding to the reference wavelength pulse need not be controlled since it is presumably preset to the appropriate value. The response of the measure wavelength of course varies and thus a pulse type of dynode voltage control is appropriate, or one that maintains the difference between the response of the measure and reference wavelengths at zero. Ideal systems, of course, execute this function and at the same time maintain the response to the reference wavelength at a constant value regardless of sample turbidity or choice of the reference wavelength.

While certain specific embodiments of an improved light source noise-compensated dual wavelength spectrophotometer have been disclosed in the foregoing description, it will be understood that various modifications within the spirit of the invention may occur to those skilled in the art. Therefore it is intended that no limitations be

What is claimed is:

1. In a dual beam spectrophotometer, a source of radiant energy, means to derive two beams of different wavelength from said source, a sample holder, means to combine said two beams into a time-shared composite beam and to direct said composite beam toward said sample holder, measuring photosensitive signal-deriving means positioned to receive radiation from said sample holder resulting from the reception therein of said composite beam, compensating photosensitive signal-deriving means, means to divert a portion of said time-shared composite beam toward said compensating photosensitive signal-driving means, means to subtract the output of said compensating photosensitive means from the output of said measuring photosensitive means, whereby to derive a resultant signal substantially compensated for radiation source noise and means to selectively attenuate the output of said compensating photosensitive means to correct for unbalance.

2. The dual beam spectrophotometer of claim 1, and radiation scattering means beween said diverting means and said compensating photosensitive means.

3. The dual beam spectrophotometer of claim 1, and wherein said diverting means comprises a partially reflecting-partially transparent plate member non-perpendicularly inclined to and in the path of said time-shared composite beam.

4. The dual beam spectrophotometer of claim 1, and wherein said measuring and compensating photosensitive means comprises respective photomultiplier tubes.

5. The dual beam spectrophotometer of claim 1, and wherein said means to derive the two beams of radiation includes at least one monochromator of the wavelength scanning type, whereby the wavelength of at least one of the two beams may be varied.

6. The dual beam spectrophotometer of claim 1, and wherein said source comprises a gaseous arc lamp.

7. The dual beam spectrophotometer of claim 1, and wherein the attenuating means comprises means to regulate the response of the compensating photosensitive means.

8. The dual beam spectrophotometer of claim 1, and wherein the attenuating means comprises means to optically regulate the radiation flux input to the compensating photosensitive means.

9. The dual beam spectrophotometer of claim 1, and wherein said subtraction means comprises a differential amplifier.

10. The dual beam spectrophotometer of claim 8, and wherein the means to optically regulate the radiation flux input to the compensating photosensitive means comprises a pair of crossed polarizers, one being positioned in the path of one of said two beams and the other being positioned between said diverting means and said compensating photosensitive signal-deriving means.

11. The dual beam spectrophotometer of claim 11, and wherein said one of the polarizers is fixed in position and said other polarizer is rotatable to vary the degree of attenuation of the flux input to the compensating photosensitive means.

12. The dual beam spectrophotometer of claim 7, and wherein said compensating photosensitive means comprises a photosensitive electrical valve device and the means to regulate the response of the compensating photosensitive means comprises circuit means to regulate the load resistance of the device and thereby control its response characteristics.

13. The dual beam spectrophotometer of claim 12, and wherein the compensating photosensitive means is a photomultiplier tube.

14. The dual beam spectrophotometer of claim 13, and wherein said circuit means includes a pair of adjustable load resistors and means to alternately insert said load resistors in the load current circuit of the photomultiplier tube in phase with the combining of said two beams into said time-shared composite beam.

15. The dual beam spectrophotometer of claim 14, and wherein the means to alternately insert said load resistors comprises respective transistors in circuit with said adjustable load resistors and means to render said transistors alternately conducting in phase with the combining of said two beams into said time-shared composite beam.

16. The dual beam spectrophotometer of claim 7, and wherein said compensating photosensitive means comprises a photosensitive electrical valve device and the means to regulate the response of the compensating photosensitive means comprises circuit means to regulate the supply voltage to said valve device.

17. The dual beam spectrophotometer of claim 16, and wherein the compensating photosensitive means is a photomultiplier tube.

18. The dual beam spectrophotometer of claim 17, and wherein said circuit means comprises an electronic attenuator device having two modes of operation providing two respectve degrees of attenuation and means to alternate said modes substantially in phase with the combining of said two beams into said time-shared composite beam.

19. The dual beam spectrophotometer of claim 18, and wherein said attenuator device is a vacuum tube connected between the supply voltage source of the photomultiplier tube and the dynodes thereof, and the means to alternate said modes comprises means to alternately supply different bias voltages to the grid of said vacuum tube.

References Cited

UNITED STATES PATENTS 3,446,972    5/1969    Bentley et al. _____ 356—220

OTHER REFERENCES

Cytochromes; Britton Chance; Proc. of the International Sympon Enzyme Chemistry; Pan-Pacific Press; 1958; pp. 10–11.

Chemical Instrumentation; Strobel; Addison-Wesley Pub. Co., Inc.; copyright 1960; pp. 204–205.

RONALD L. WIBERT, Primary Examiner
V. P. McGRAW, Assistant Examiner

U.S. Cl. X.R.

250—220 R, 226; 356—93, 206